Figure 1:
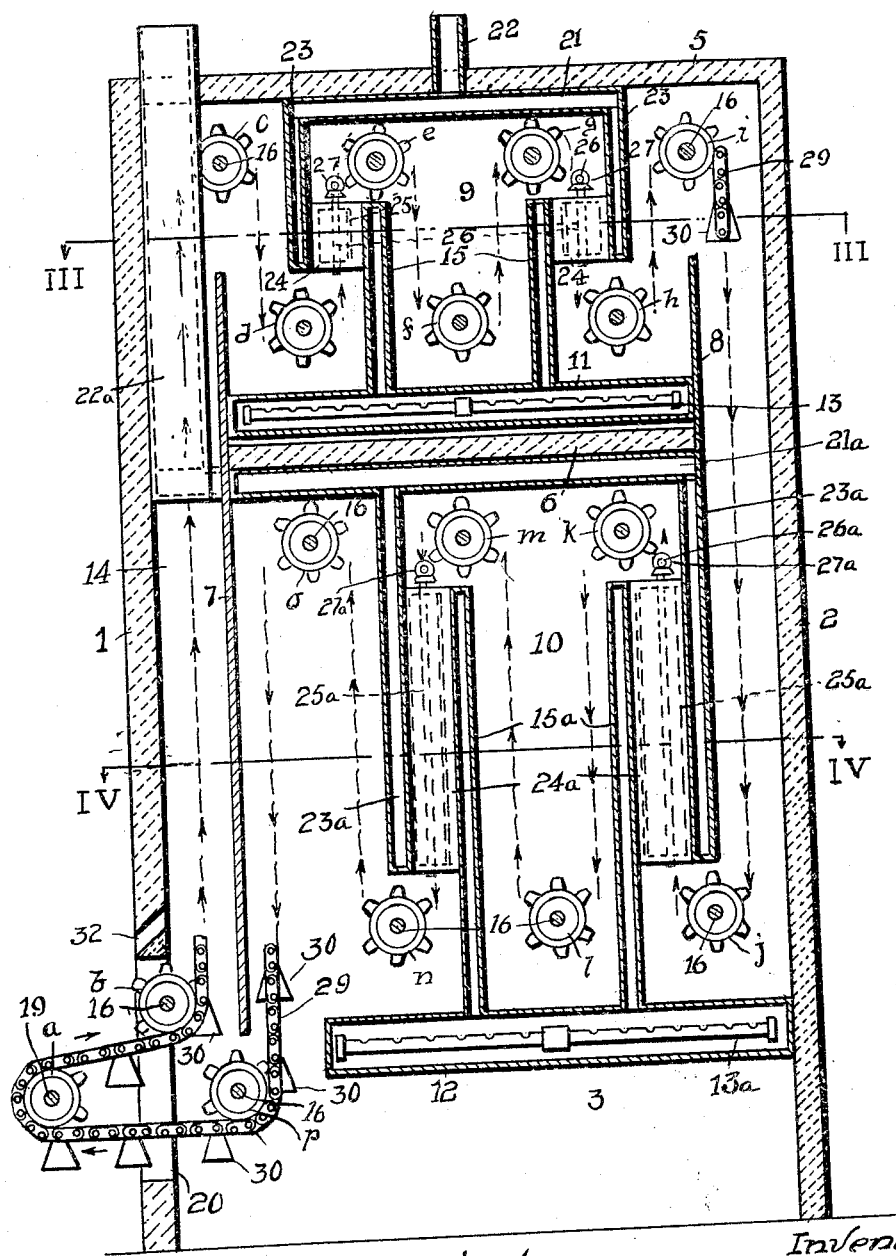

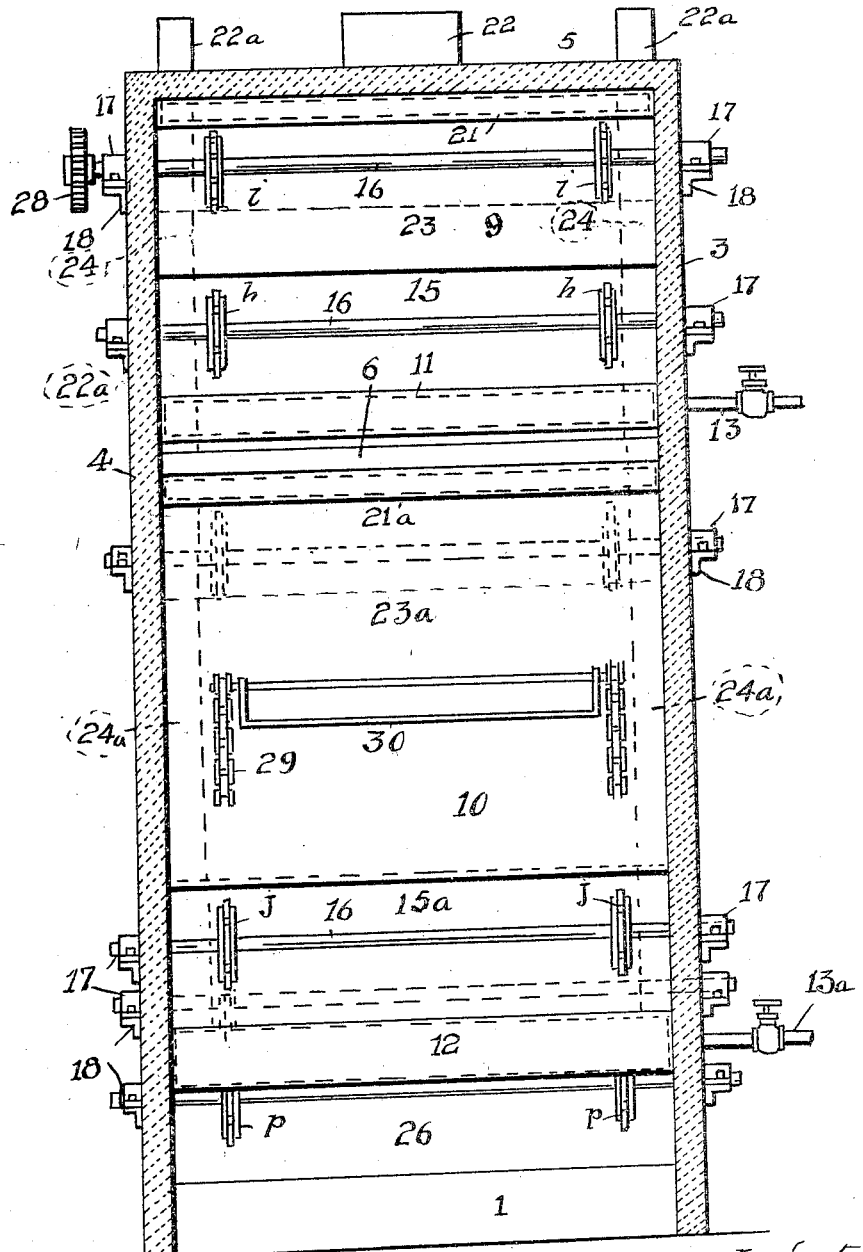

Sept. 2, 1924.
N. R. MOSS
BAKING OVEN
Filed Oct. 28, 1922
1,506,853
3 Sheets-Sheet 3
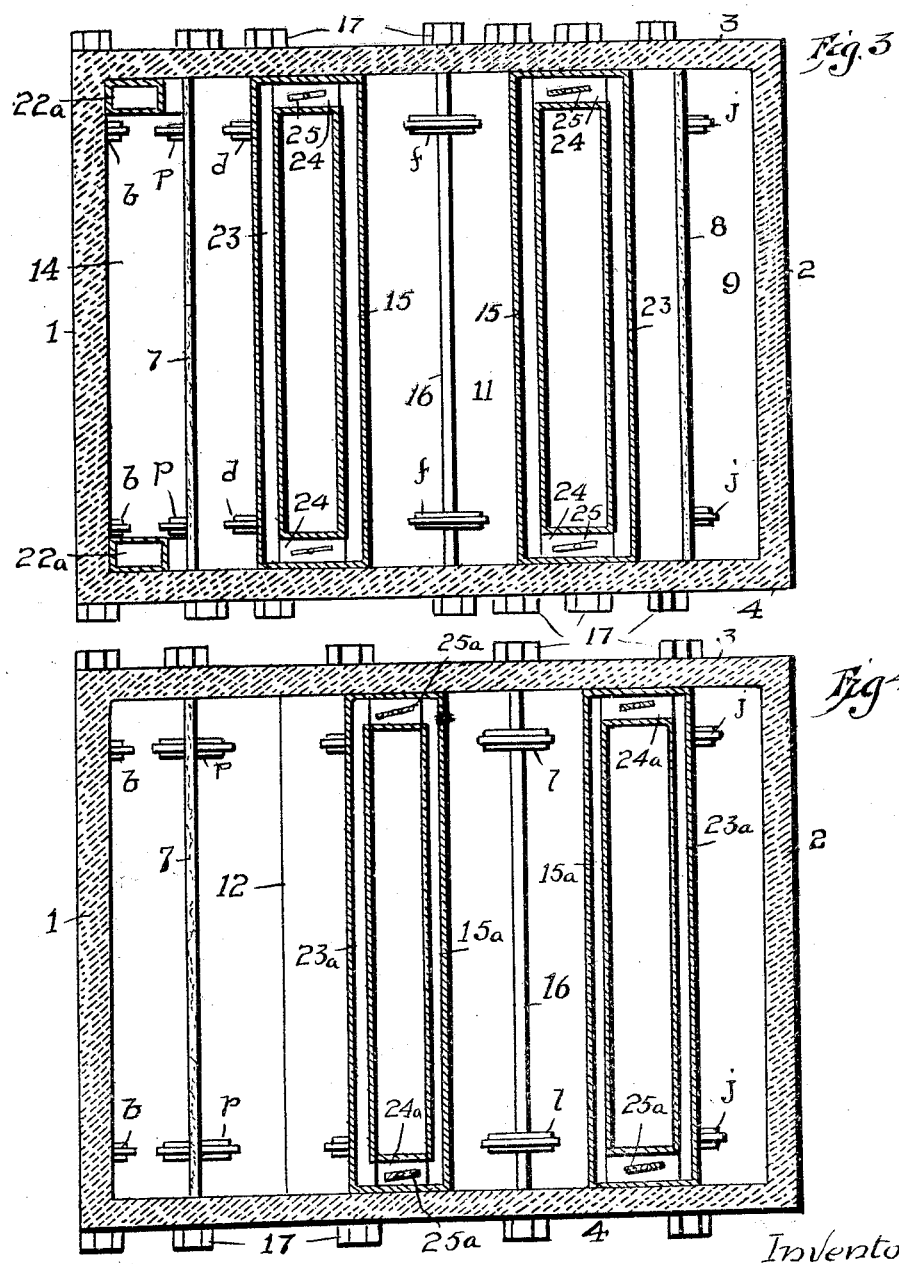

Patented Sept. 2, 1924.

1,506,853

UNITED STATES PATENT OFFICE.

NORMAN R. MOSS, OF PITTSBURGH, PENNSYLVANIA.

BAKING OVEN.

Application filed October 28, 1922. Serial No. 597,476.

*To all whom it may concern:*

Be it known that I, NORMAN R. MOSS, a citizen of the United States, residing at Pittsburgh, in the county of Allegheny and State of Pennsylvania, have invented new and useful Improvements in Baking Ovens, of which the following is a specification.

My invention relates to baking ovens of the type wherein the articles are progressively carried through the oven by endless conveyers.

The object of this invention is to provide an efficient apparatus whereby bread or the like will be baked under proper conditions as to time, temperature and moisture. It is one object to provide my oven with zones or chambers provided with separate sources of controlled heat, these being insulated to a greater or smaller extent from each other. Another object is to dispose heating flues at various places in the said zone and cause the loaves to pass in a more or less serpentine manner about the flues. Other objects appear hereinafter.

Referring to the accompanying drawings, Fig. 1 is a vertical section of an oven embodying the principles of my invention; Fig. 2, a verticular section taken at right angles to the plane on which Fig. 1 is taken; Fig. 3, a horizontal section on the line III—III of Fig. 1; and Fig. 4, a horizontal section on the line IV—IV of Fig. 1.

On the drawings, I show my oven with the front wall 1, the rear wall 2, the side walls 3 and 4 and the top 5, all made of heat-insulating material, as, refractory brick, or asbestos or the like, or combinations of the same.

6 is a horizontal partition of heat-insulating material extending from the wall 3 to the wall 4, but spaced from the walls 1 and 2, and, with the vertical heat-insulating partitions 7 and 8, dividing the interior of the oven into upper and lower baking chambers 9 and 10. At the bottoms of the chambers are the heating chambers 11 and 12 provided with the gas burners 13 and 13ª. The partition 7 extends laterally from the wall 3 to the wall 4, and vertically from about the level of the heating chamber 12 to some distance above the heating chamber 1, and makes a tight joint with the front edge of the partition 6. There is thus a vertical passage 14 between the front wall 1 and the partition 7. The partition 8 is joined to the rear edge of the partition 6 and extends upwardly only and is connected to the side walls 3 and 4.

A number of heating flues in communication with the heating chambers 11 and 12 are provided in each baking chamber 9 and 10. In the chamber 9 I show two vertical heating flues 15 extending from the wall 3 to the wall 4 and upwardly nearly to the lower edges of the sprocket-wheels $e$ and $g$ near the top of the chamber 9. These sprocket-wheels as well as all the sprocket-wheels shown except the one marked $a$ are supported on the shaft 16 mounted in bearings 17 carried by the brackets 18 on the sides 3 and 4 of the oven, the shaft 19 for the sprocket $a$ being supported in any suitable manner opposite the opening 20 near the lower end of the front wall 1. The sprocket-wheels in the oven are all arranged two on each shaft, one near each side wall 3 and 4, but separated therefrom sufficiently to accommodate certain cross-over flues presently to be described.

At the top of the chamber 9 is the waste-gas collecting chamber or box 21 provided with the outlet or off-take flue 22 extending through the top 5 and opening at its lower end into the center of the chamber 21 and at its upper end into the atmosphere. Two vertical heating flues 23 communicate with the interior of the chamber 21, extend from the wall 3 to the wall 4, and down to the sprocket-wheels $d$ and $h$ near the bottom of the baking chamber 9. Each flue 15 is connected with a corresponding flue 23 by means of cross-over flues 24, which lie next to the side walls 3 and 4 and communicate with the top portion of one flue 15 and the lower portion of one flue 23, the flues 24 being confined between the side walls and the adjacent sprocket-wheels. These cross-over flues are preferably proportioned so as to carry without serious retardation all the gaseous products in the flues 15 over to the flues 23. The flues 24 are provided with butterfly or other dampers 25 operated, for example, by rods 26 extending to the outside of the oven and connected to the damper by bevel gears 27.

The heating chamber 12 is provided with heating flues 15ª which extend up to the upper sprocket-wheels $k$ and $m$ and in the plane of their shafts 16. The top of the chamber 10 has the waste-gas collecting chamber or box 21ª, with which the upper ends of the heating flues 23ª communicate, the latter flues extending down to the sprocket-wheels $j$ and $n$. Each flue 15ª is connected to one flue 23ª by a cross-over flue 24ª arranged between the upper and lower sprocket-wheels and connecting a flue 15ª to a flue 23ª, the flues 24ª lying next to the side walls 3 and 4 and between them and the adjacent sprocket-wheels. The flues 24ª are provided with dampers 25ª operated by rods 26ª by means of bevel gears 27ª. The chamber 21ª is connected to the two outlet flues 22ª extending upwardly in the upper part of the passage 14, the flues 22ª standing between one of the walls 3 or 4 and the adjacent sprocket-wheel.

One of the shafts 16, as the one carrying the sprocket-wheels $c$, is provided with the driving gear 28, operated by any desired means.

Sprocket chains 29, indicated in places by links in full lines and elsewhere by light lines provided with arrow heads, run on the sprocket-wheels $a$ to $p$, which carry the trays or shelves 30 loosely hung on the chains in a manner well known to those acquainted with the art of baking ovens. The sprocket-wheels are arranged in each baking chamber at two levels so that the trays on the chains will travel in a serpentine path close to and parallel with the heating flues. Bread placed in the tray 30 between the sprocket-wheels $a$ and $b$ will travel under the wheels $b$, up the passage 14 between the wheels $c$, down near the adjacent flue 23, under the said flue 23 and the wheel $d$, up near one side of the adjacent flue 15 and between the same and the said flue 23, between the wheels $e$, down near the remaining side of the flue 15, under the wheels $f$, up near one side of the second flue 15, between the wheels $g$ and above the last named flue 15, down near one side of the second flue 23, down between the second flues 15 and 23 and further down near the remaining side of the flue 5, under the wheel $h$ and the second flue 23, up near the remaining side of the last named flue, between the wheels $i$, down the passage 31 between the wall 2 and the partition 8 and the outer side of the right-hand flue 23ª. Thence the tray travels under the wheel $j$, up along and between the right-hand flues 23ª and 15ª, down near the said flue 24ª, up near the left-hand flue 15ª, down along and between the left-hand flues 15ª and 23ª, up near the flue 23ª, down near the partition 7, and under the wheels $p$ and $a$, where the bread is removed from the tray properly baked if the speed of the chains and the temperatures have been properly regulated, which can be accomplished by means well known. The bread travels in similar courses in the two chambers 9 and 10, but takes a longer course in the chamber 10 which is higher than the chamber 9. The temperature is kept higher in the chamber 10 for the crusting and final baking by regulating the gas supply to the burners 13, by the operation of the dampers 25′ or both. The insulated partitions 6, 7 and 8 prevent any appreciable amount of heat from passing from the chamber 10 to the chamber 9. It is to be noted that each chamber 9 and 10 is also heated from below by the radiation of heat directly from the heaters 11 and 12. The baking temperature is made progressively higher or as desired by regulating the dampers 25 and 25ª independently, so that, for example, more heat may pass through the right-hand flues 15 and 23 than in the left-hand ones; and more heat may pass through the left-hand flues 15ª and 23ª than through the right-hand ones.

Moist steam is supplied to the bottom of the passage 14 through the inlet 32, the steam condensing on the cooler loaves of bread to improve the quality of the crust thereon.

I do not confine my invention to the specific details and combinations shown or described, but desire that the same shall cover such modifications as come within the scope of the appended claims.

I claim—

1. In a baking oven, two baking chambers separated by heat-insulating partitions, a heating chamber in each chamber, an endless conveyer, means carried by the same for supporting articles to be baked, means causing the conveyer to travel back and forth in each chamber, flues in each baking chamber communicating at one end with the heating chamber therein and projecting between adjacent oppositely movable portions of the conveyer, other flues in each chamber projecting oppositely to the direction of the first flues and extending between adjacent oppositely moving portions of the conveyer, outlets for the second flues, and cross-flues out of the path of the conveyor connecting the inner ends of oppositely-projecting flues.

2. In a baking oven, baking chambers separated by heat-insulating partitions, a heating chamber at one side of each oven, parallel flues connected to each heating chamber and extending partly across each baking chamber, parallel offtake flues projecting from the opposite side of each chamber and into the same on different planes from those of the first flues, cross-flues connecting inner ends of oppositely extending flues, a conveyer, means for causing it to travel in a serpentine manner along the said flues and around their inner ends, and means carried by the conveyer for supporting articles to be baked.

3. In a baking oven, two baking chambers, parallel sets of flues projecting into each chamber alternately from opposite sides thereof, means supplying heat to the outer ends of one set of flues and carrying off waste gases from the outer ends of the other set of flues, a conveyer, means for causing it to travel in a serpentine manner between the members of the sets of flues, means carried by the conveyer for supporting articles to be baked, and cross-flues out of the path of the conveyer for connecting the inner ends of the members of one set of flues to the inner ends of the other set.

4. In a baking oven, two baking chambers, parallel sets of flues projecting into each chamber alternately from opposite sides thereof, means supplying heat to the outer ends of one set of flues and carrying off waste gases from the outer ends of the other set of flues, a conveyer, means for causing it to travel in a serpentine manner between the members of the sets of flues, means carried by the conveyer for supporting articles to be baked, cross-flues out of the path of the conveyer for connecting the inner ends of the members of one set of flues to the inner ends of the other set, and a damper for regulating the flow of heated air through the flues.

5. In a baking oven, two baking chambers one over the other, having heat-insulating partitions, a heating chamber at the bottom of each baking chamber, a conveyer having a serpentine course in each baking chamber, and heating flues communicating with the heating chambers and projecting downwardly between upwardly-open spaces between adjacent oppositely traveling portions of the conveyer.

6. In a baking oven, two baking chambers one over the other, having heat-insulating partitions, a heating chamber at the bottom of each baking chamber, a conveyer having a serpentine course in each baking chamber, heating flues communicating with the heating chambers and projecting downwardly between upwardly-open spaces between the adjacent oppositely traveling portions of the conveyer, and means for controlling the rate of the passage of heated air through the flues.

7. In a baking oven, a pair of superimposed baking chambers separated by a heat-insulating partition, a heating chamber at the bottom of each chamber, a waste-gas collecting chamber at the top of each baking chamber, a conveyer having a serpentine course in each baking chamber, two sets of flues in each baking chamber alternately projecting from the heating and collecting chambers and having their inner ends between oppositely moving portions of the conveyer, cross-flues out of the path of the conveyer connecting the inner ends of one set of flues to the inner ends of the other set, vertical flues at the sides of the oven and out of the path of the conveyer for conducting gases from the lower heating chamber.

In testimony whereof, I affix my signature this 30th day of September, 1922.

NORMAN R. MOSS.